United States Patent
Kim et al.

(10) Patent No.: US 8,814,415 B2
(45) Date of Patent: Aug. 26, 2014

(54) LIGHT-EMITTING MODULE AND DISPLAY DEVICE HAVING THE SAME

(75) Inventors: Hyoung-Joo Kim, Uiwang-si (KR); Ju-Young Yoon, Seoul (KR); Jae-Joong Kwon, Suwon-si (KR); Chi-O Cho, Asan-si (KR); Jin-Hee Park, Cheonan-si (KR); Joo-Young Kim, Asan-si (KR); Sung-Kyu Shim, Seoul (KR)

(73) Assignee: Samsung Display Co., Ltd. (KR)

( * ) Notice: Subject to any disclaimer, the term of this patent is extended or adjusted under 35 U.S.C. 154(b) by 712 days.

(21) Appl. No.: 12/766,747

(22) Filed: Apr. 23, 2010

(65) Prior Publication Data
US 2010/0290246 A1    Nov. 18, 2010

(30) Foreign Application Priority Data
May 13, 2009    (KR) .................. 10-2009-0041482

(51) Int. Cl.
*F21V 7/04*    (2006.01)

(52) U.S. Cl.
CPC .............. *G02B 6/002* (2013.01); *G02B 6/0083* (2013.01); *G02B 6/0021* (2013.01); *G02B 6/0091* (2013.01)
USPC ........... 362/612; 362/600; 362/602; 362/606; 362/607; 362/617; 362/621; 362/628; 362/633

(58) Field of Classification Search
USPC ......... 362/602, 612, 600, 606, 607, 617, 621, 362/628, 633
See application file for complete search history.

(56) References Cited

U.S. PATENT DOCUMENTS

| | | | | |
|---|---|---|---|---|
| 6,065,845 | A * | 5/2000 | Miyazaki | 362/26 |
| 6,669,350 | B2 * | 12/2003 | Yamashita et al. | 362/612 |
| 6,676,268 | B2 * | 1/2004 | Ohkawa | 362/613 |
| 6,814,457 | B2 * | 11/2004 | Chang et al. | 362/612 |
| 6,860,629 | B2 * | 3/2005 | Velez | 362/559 |
| 6,877,872 | B2 * | 4/2005 | Suzuki et al. | 362/627 |
| 7,001,058 | B2 * | 2/2006 | Inditsky | 362/610 |
| 7,048,427 | B2 * | 5/2006 | Fujino et al. | 362/621 |
| 7,123,316 | B1 * | 10/2006 | Yang et al. | 349/65 |
| 7,188,989 | B2 * | 3/2007 | Miyashita | 362/621 |
| 7,273,311 | B2 * | 9/2007 | Yu | 362/620 |
| 7,275,850 | B2 * | 10/2007 | Nesterenko et al. | 362/609 |
| 7,338,197 | B2 * | 3/2008 | Inditsky | 362/615 |

(Continued)

FOREIGN PATENT DOCUMENTS

| | | |
|---|---|---|
| JP | 2005-174706 | 6/2005 |
| JP | 2007-279474 | 10/2007 |
| KR | 10-2005-0064168 A | 6/2005 |

*Primary Examiner* — Thomas A Hollweg
(74) *Attorney, Agent, or Firm* — Innovation Counsel LLP

(57) ABSTRACT

A light-emitting module includes a light guide plate and a light source unit in accordance with an embodiment. The light guide plate include an upper surface, a lower surface facing the upper surface, a plurality of side surfaces connecting the upper surface and the lower surface, and a cross-sectional surface connected to at least one of the side surfaces. The light source unit includes a substrate disposed in correspondence with the cross-sectional surface and a point light source mounted on the substrate to emit light to the cross-sectional surface. Thus, light-emitting efficiency may be enhanced and the arrangement of point light sources may be optimized, so that a required amount of emitted light may be obtained using a small number of the point light sources. In addition, uniformity of luminance and heat-radiating efficiency may also be enhanced.

16 Claims, 7 Drawing Sheets

(56) References Cited

U.S. PATENT DOCUMENTS

| | | | |
|---|---|---|---|
| 7,374,327 B2* | 5/2008 | Schexnaider | 362/613 |
| 7,380,969 B2* | 6/2008 | Yamashita et al. | 362/612 |
| 7,446,828 B2* | 11/2008 | Tamura et al. | 349/64 |
| 7,517,127 B2* | 4/2009 | Takada | 362/608 |
| 7,527,412 B2* | 5/2009 | Lee et al. | 362/617 |
| 7,575,358 B2* | 8/2009 | Suzuki et al. | 362/613 |
| 7,611,273 B2* | 11/2009 | Seo et al. | 362/612 |
| 7,614,777 B2* | 11/2009 | Koganezawa et al. | 362/620 |
| 7,671,936 B2* | 3/2010 | Chang | 349/65 |
| 8,272,771 B2* | 9/2012 | Arai | 362/608 |
| 2002/0044436 A1* | 4/2002 | Ohkawa | 362/31 |
| 2002/0054488 A1* | 5/2002 | Ohkawa | 362/31 |
| 2002/0163790 A1* | 11/2002 | Yamashita et al. | 362/31 |
| 2002/0172039 A1* | 11/2002 | Inditsky | 362/231 |
| 2002/0175632 A1* | 11/2002 | Takeguchi | 315/169.1 |
| 2003/0067789 A1* | 4/2003 | Velez | 362/555 |
| 2003/0218874 A1* | 11/2003 | Fujino et al. | 362/31 |
| 2004/0114069 A1* | 6/2004 | Lai | 349/65 |
| 2005/0201120 A1* | 9/2005 | Nesterenko et al. | 362/609 |
| 2005/0231976 A1* | 10/2005 | Keuper et al. | 362/600 |
| 2006/0072339 A1* | 4/2006 | Li et al. | 362/608 |
| 2006/0077690 A1* | 4/2006 | Inditsky | 362/615 |
| 2006/0078267 A1* | 4/2006 | Cha et al. | 385/146 |
| 2006/0164863 A1* | 7/2006 | Chang et al. | 362/621 |
| 2006/0245211 A1* | 11/2006 | Takada | 362/615 |
| 2007/0064444 A1* | 3/2007 | Kim et al. | 362/612 |
| 2007/0127267 A1* | 6/2007 | Chen | 362/626 |
| 2007/0147079 A1* | 6/2007 | Wu et al. | 362/612 |
| 2007/0177405 A1* | 8/2007 | Chan et al. | 362/613 |
| 2007/0195524 A1* | 8/2007 | Seo et al. | 362/228 |
| 2007/0236957 A1* | 10/2007 | Koganezawa et al. | 362/561 |
| 2008/0094853 A1* | 4/2008 | Kim et al. | 362/612 |
| 2008/0198626 A1* | 8/2008 | Lai et al. | 362/628 |
| 2008/0259641 A1* | 10/2008 | Suzuki et al. | 362/612 |
| 2008/0266900 A1* | 10/2008 | Harbers et al. | 362/609 |

* cited by examiner

LIGHT-EMITTING MODULE AND DISPLAY DEVICE HAVING THE SAME

PRIORITY STATEMENT

This application claims priority under 35 U.S.C. §119 to Korean Patent Application No. 2009-0041482, filed on May 13, 2009 in the Korean Intellectual Property Office (KIPO), the contents of which are herein incorporated by reference in their entirety.

BACKGROUND

1. Technical Field

One or more embodiments of the present invention relate to a light-emitting module and a display device having the light-emitting module. More particularly, one or more embodiments of the present invention relate to a light-emitting module which guides emitted light using a light guide plate to form surface light, and a display device having the light-emitting module.

2. Description of the Related Art

Generally, flat panel display devices, such as the liquid crystal display (LCD) devices, have various advantages, such as having thinner thickness, lighter weight, lower driving voltage and lower power consumption, etc., compared to other types of display devices. Thus, the LCD device is widely employed for various electronic devices requiring displays. An LCD panel of the LCD device does not self-emit light, so that the LCD device includes an additional light source apparatus to provide the LCD panel with light.

For example, a cold cathode fluorescent lamp (CCFL) and a light-emitting diode (LED) are mainly used as light sources for the light source apparatus. The CCFL generates light that is close to natural light at a relatively low temperature. The LED has superior color reproducibility and low power consumption. The LED is a semiconductor device which emits light in response to current applied thereto. However, only about 20% to about 30% of the applied current is used by the LED for emitting light, and the remaining current is consumed to generate heat energy. Since the heat energy is generated during light emitting operation, the light-emitting efficiency of the LED may be low.

In a light source apparatus of an edge illumination type backlight assembly, a light guide plate and light sources that are disposed at the light guide plate may form surface light that is provided to a rear surface of a display panel. When the LEDs are used as the light source, the LEDs are mounted on a flexible printed circuit film in which wiring patterns are formed thereon to be disposed at a side surface of the light guide plate. However, as the number of the LEDs is increased, manufacturing costs of the backlight assembly is correspondingly increased. In addition, hot spots may be viewed at front sides of the LEDs, so that luminance uniformity is decreased. Thus, it is desirable to reduce the number of LEDs in the light source apparatus while enhancing luminance uniformity.

Moreover, even though the LED has superior color reproducibility, fast response time, and low power consumption, the performance of the LED may be more influenced by heat compared to other light sources. Thus, it is important that heat is effectively irradiated so that the temperature of the LED and the temperature of a peripheral portion adjacent to the LED are maintained at no more than a predetermined temperature.

SUMMARY

One or more embodiments of the present invention provide a light-emitting module capable of obtaining emitted light in which heat-radiating efficiency may be enhanced using a small number point light source.

One or more embodiments of the present invention also provide a display device having the above-mentioned light-emitting module.

According to one or more embodiments of the present invention, a light-emitting module includes a light guide plate and a light source unit. The light guide plate include an upper surface, a lower surface facing the upper surface, a plurality of side surfaces connecting the upper surface and the lower surface, and a cross-sectional surface connected to at least one of the side surface. The light source unit includes a substrate disposed in correspondence with the cross-sectional surface and a point light source mounted on the substrate to emit light to the cross-sectional surface.

In one or more embodiments of the present invention, at least one of a corner surface and a recess surface may be formed through the cross-sectional surface. The corner surface may be formed by cutting a corner at which the side surfaces meet each other, and the recess surface may be formed by removing a portion of the light guide plate from the side surface to the interior of the light guide plate. The cross-sectional surfaces may have a serrated structure to include a plurality of semi-circular lens.

In one or more embodiments of the present invention, the substrate may be bent a plurality of times to be disposed to face the cross-sectional surface and side surfaces adjacent to the cross-sectional surface. The point light source may include a light-emitting diode of a top view type having a light-exiting portion formed thereon, which faces the cross-sectional surface. Alternatively, the substrate may be disposed in parallel with the lower surface of the light guide plate and to be exposed toward the cross-sectional surface. In this case, the point light source may include a light-emitting diode of a side view type having a light-exiting portion formed thereon, which faces the cross-sectional surface.

According to one or more embodiments of the present invention, a display device includes a light guide plate, a display panel, a middle frame, and a light source unit. The light guide plate includes an upper surface, a lower surface facing the upper surface, a plurality of side surfaces connecting the upper surface and the lower surface, and a cross-sectional surface connected to at least one of the side surface. The display panel assembly includes a display panel disposed on the upper surface, and a driving substrate driving the display panel. The middle frame supports the display panel assembly to receive the light guide plate. The light source unit includes a substrate disposed in correspondence with the cross-sectional surface and a point light source mounted on the substrate to emit light to the cross-sectional surface. The light source unit is received in the middle frame.

In one or more embodiments of the present invention, at least one of a corner surface and a recess surface may be formed through the cross-sectional surface. The corner surface may be formed by cutting a corner at which the side surfaces meet each other, and the recess surface may be formed by removing a portion of the light guide plate from the side surface to the interior of the light guide plate. The substrate may include a heat-radiating plate and a flexible printed circuit film. The heat-radiating plate may be bent a plurality of times to be disposed to face the cross-sectional surface and the side surfaces adjacent to the cross-sectional surface. The flexible printed circuit film may be disposed on the heat-radiating plate to face the cross-sectional surface. The flexible printed circuit film may deliver driving power to the point light source. Alternatively, the substrate may be disposed in parallel with a lower surface of the light guide plate and to be exposed toward the cross-sectional surface.

According to one or more embodiments of the present invention, in a light-emitting module and a display device having the light-emitting module, light-emitting efficiency may be enhanced and the arrangement of point light sources may be optimized, so that a required amount of emitted light may be obtained using a small number of the point light sources. Uniformity of luminance and heat-radiating efficiency may also be enhanced.

BRIEF DESCRIPTION OF THE DRAWINGS

The above and other embodiments of the present invention will be described in detail with reference to the accompanying drawings, in which.

DETAILED DESCRIPTION

Figure 1:
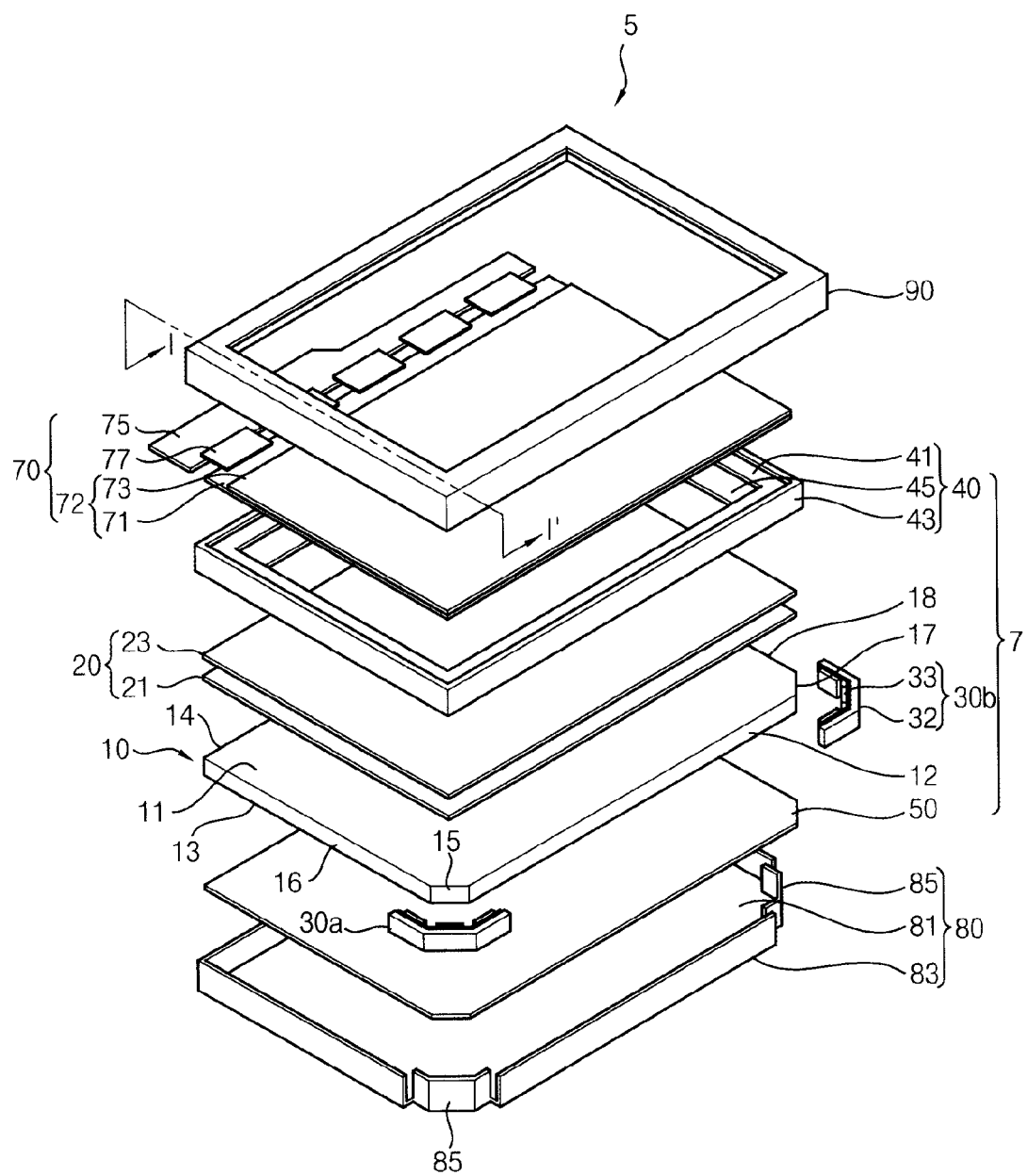
FIG. 1 is an exploded perspective view schematically illustrating a display device according to one or more embodiments of the present invention.

Embodiments of the present invention are described more fully hereinafter with reference to the accompanying drawings, in which one or more embodiments of the present invention are shown. The present invention may, however, be embodied in many different forms and should not be construed as being limited to the embodiments set forth herein. Rather, the scope of the present invention will only be defined by the appended claims. In the drawings, the sizes and relative sizes of layers and regions may be exaggerated for clarity.

It will be understood that when an element or layer is referred to as being "on," "connected to" or "coupled to" another element or layer, it may be directly on, connected to or coupled to the other element or layer, or intervening elements or layers may be present. In contrast, when an element is referred to as being "directly on," "directly connected to" or "directly coupled to" another element or layer, there are no intervening elements or layers present. Like reference numerals refer to like elements throughout. As used herein, the term "and/or" includes any and all combinations of one or more of the associated listed items.

It will be further understood that, although the terms first, second, third, etc., may be used herein to describe various elements, components, regions, layers and/or sections, these elements, components, regions, layers and/or sections should not be limited by these terms. Rather, these terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as being "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein may likewise be interpreted accordingly.

The terminology used herein is for the purpose of describing particular embodiments of the present invention only and is not intended to be limiting of other embodiments of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

One or more embodiments of the present invention are described herein with reference to cross-sectional illustrations that are schematic illustrations of idealized embodiments (and intermediate structures) of the present invention. As such, variations from the shapes of the illustrations as a result, for example, of manufacturing techniques and/or tolerances, are to be expected. Thus, embodiments of the present invention should not be construed as being limited to the particular shapes of regions illustrated herein, but are to include deviations in shapes that may result, for example, from manufacturing tolerances. For example, an implanted region illustrated as a rectangle will, typically, have rounded or curved features and/or a gradient of implant concentration at its edges rather than a binary change from an implanted to a non-implanted region. Likewise, a buried region formed by implantation may result in some implantation in the region between the buried region and the surface through which the implantation takes place. Thus, the regions illustrated in the figures are schematic in nature, and their shapes are not intended to illustrate the actual shape of a region of a device and are not intended to limit the scope of the present invention.

Unless otherwise defined, all terms (including technical and scientific terms) used herein have the same meaning as they are commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be explained in detail with reference to the accompanying drawings.

Figure 2:
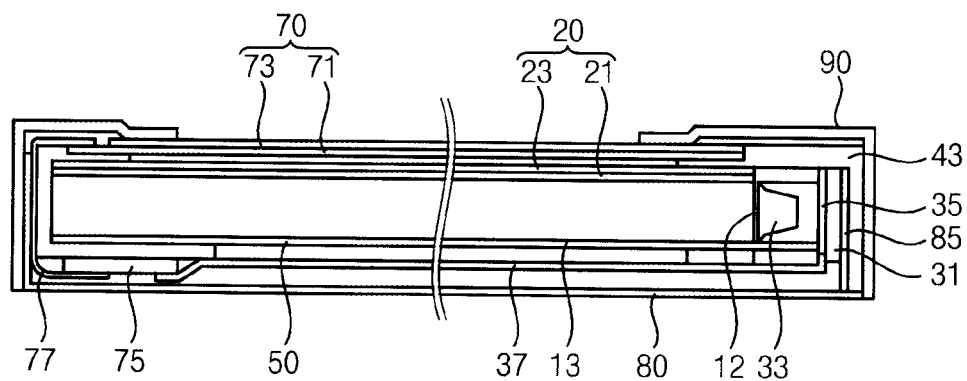
FIG. 2 is a cross-sectional view taken along a line I-I' of FIG. 1 according to one or more embodiments of the present invention.

FIG. 1 is an exploded perspective view schematically illustrating a display device 5 according to one or more embodiments of the present invention. FIG. 2 is a cross-sectional view taken along a line I-I' of FIG. 1 according to one or more embodiments of the present invention.

Referring to FIGS. 1 and 2, a display device 5 includes a light-emitting module 7 and a display panel assembly 70. The light-emitting module 7 is disposed below the display panel assembly 70 to provide the display panel assembly 70 with light. The display panel assembly 70 displays an image based on the light provided from the light-emitting module 7.

The light-emitting module 7 includes a light guide plate 10 and a light source unit 30.

The light guide plate 10 may have a plate shape. The light guide plate 10 includes an upper surface 11, a lower surface 13, a first side surface 12, a second side surface 16, a third side surface 18, a fourth side surface 14, and at least one cut surface such as that of 15 and 17. The upper surface 11 and the lower surface 13 are opposite to each other. The first to fourth side surfaces 12, 14, 16 and 18 connect to the upper surface 11 and the lower surface 13. The first and fourth side surfaces 12 and 14 are opposite to each other, and the second and third side surfaces 16 and 18 are opposite to each other. The fourth side surface 14 connects to the second and third surfaces 16 and 18.

In the present embodiment, a corner where the side surfaces meet is cut to form additional cross-sectional surfaces such as those of 15 and 17. The cross-sectional surface formed when the corner is cut may be defined as a corner surface. A corner where the first and second side surfaces 12 and 16 meet is cut to form a first corner surface 15. A corner where the first and third side surfaces 12 and 18 meet is cut to form a second corner surface 17. An angle formed by the first, and second corner surfaces 15, and 17 and the first side surface 12 may be determined so as to enable uniform luminance light on the upper surface 11 as a function of factors such as angles formed by the corner surfaces 15 and 17 with the second and third side surfaces 16 and 18, and the light efficiency of point light sources 33 which will be described later. The first and second corner surfaces 15 and 17 are formed at an outer portion of an effective area corresponding to a display screen of a display panel (which will be described later).

The light guide plate 10 may be formed through a mold process to mold a polymer resin having superior light transparency, heat resistance, chemical resistance, mechanical strength, etc. The polymer resin may include polymethyl methacrylate, polyamide, polyimide, polypropylene, or polyurethane, etc.

A light source unit 30 is disposed at each of the first and second corner surfaces 15 and 17. In the present embodiment, the light source unit 30 disposed at the first corner surface 15 is defined as a first light source unit 30a, and the light source unit 30 disposed at the second corner surface 17 is defined as a second light source unit 30b.

Figure 3:
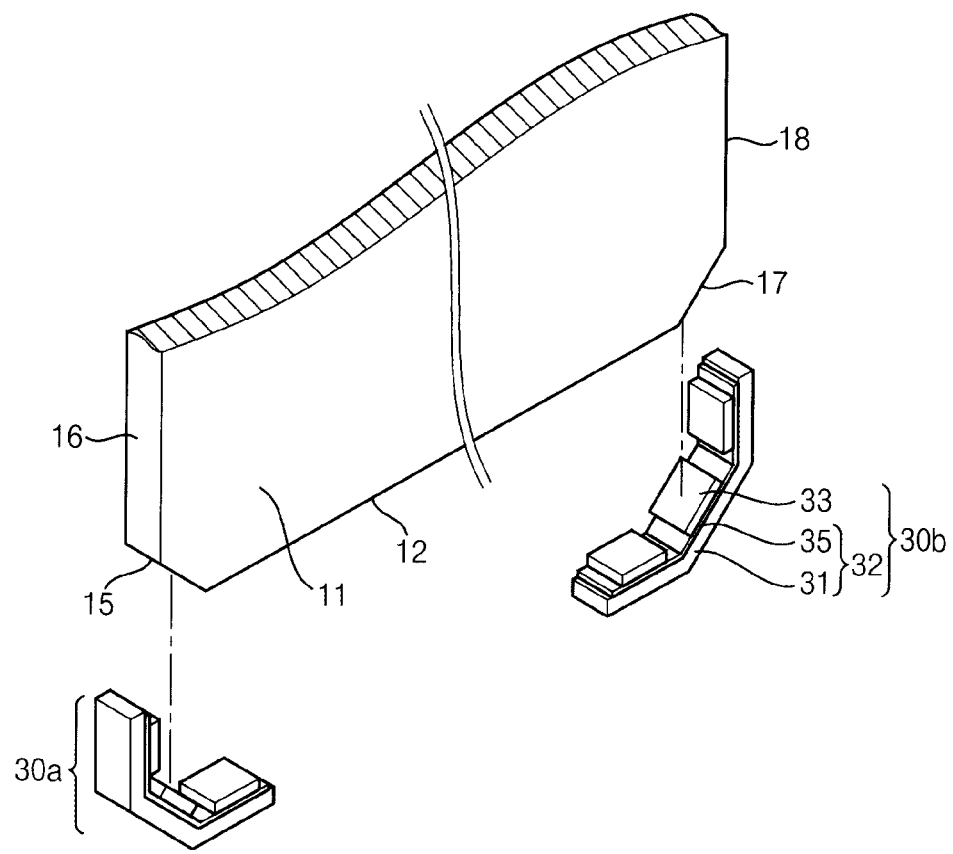
FIG. 3 is a perspective view schematically illustrating a light source unit disposed adjacent to a light guide plate according to one or more embodiments of the present invention.
Figure 4:
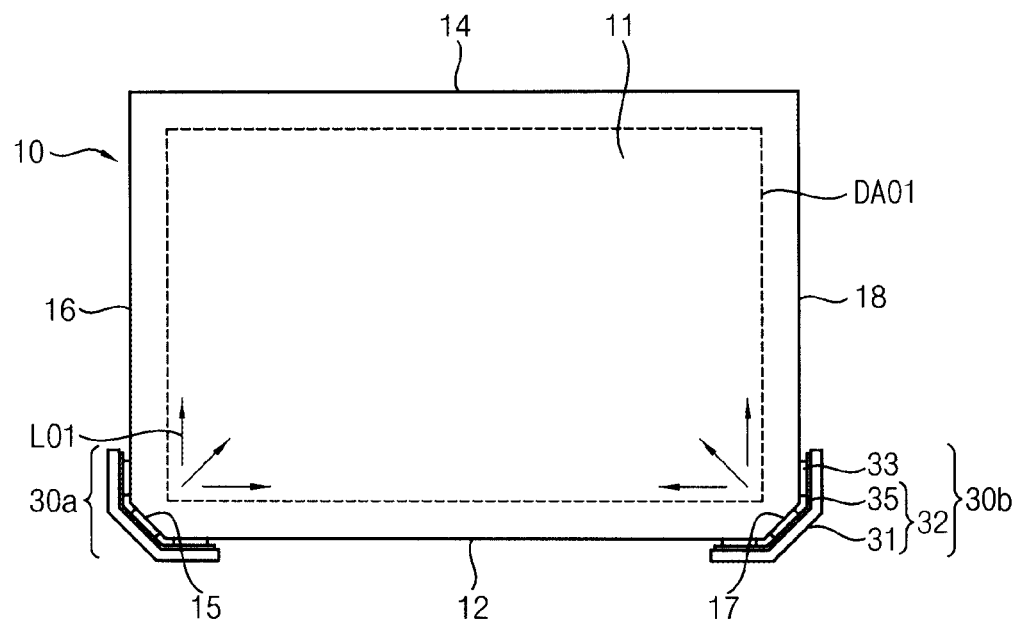
FIG. 4 is a plan view illustrating the light guide plate and the light source unit of FIG. 3 according to one or more embodiments of the present invention.

FIG. 3 is a perspective view schematically illustrating a light source unit 30 disposed adjacent to a light guide plate 10 according to one or more embodiments of the present invention. FIG. 4 is a plan view illustrating the light guide plate 10 and the light source unit 30 of FIG. 3 according to one or more embodiments of the present invention.

Referring to FIGS. 3 and 4, the light source unit 30 includes a substrate 32 and a plurality of point light sources 33.

The substrate 32 is bent a plurality of times to be disposed to face the light guide plate 10. In the present embodiment, for the first light source unit 30a, the substrate 32 is bent two times and is disposed to face the first corner surface 15, and the first and second surfaces 12 and 16 adjacent to the first corner surface 15. The substrate 32 includes a heat-radiating plate 31 and a circuit wiring part 35. The heat-radiating plate 31 is disposed in parallel with the first corner surface 15, and the first and second side surfaces 12 and 16 adjacent to the first corner surface 15. Thus, the heat-radiating plate 31 is similarly bent twice. The heat-radiating plate 31 may include a metal material having superior thermal conductivity. The heat-radiating plate 31 includes an interior surface facing the first corner surface 15, an interior surface facing the first and second side surfaces 12 and 16, and an exterior surface facing the interior surface. A plurality of embossed portions (not shown) may be formed through the exterior surface to increase a heat-radiating area of the heat-radiating plate 31.

The circuit wiring part 35 is disposed on the heat-radiating plate 31 to deliver driving power to the point light source 33. In the present embodiment, the circuit wiring part 35 includes a flexible printed circuit film 35. The flexible printed circuit film 35 includes a flexible base film and a circuit wiring formed on the inside of the base film. The flexible printed circuit film 35 is laminated on the heat-radiating plate 31. The flexible printed circuit film 35 delivers the driving power applied from the display panel assembly 70 to the point light sources 33. A first connector which applies the driving power and a plurality of connection terminals which electrically connect to the point light source 33 may be formed on the flexible printed circuit film 35, as will be described with reference to FIG. 5.

The substrate 32 may be disposed to face the first corner surface 15, and the first and second side surfaces 12 and 16 in a bent state described in FIGS. 3 and 4. Alternatively, the substrate 32 may be pressed to the first corner surface 15, the first and second side surfaces 12 and 16 so as to be bent in a planar state.

The point light sources 33 are mounted on the substrate 32 to emit light to the light guide plate 10. The point light source 33 may include a first point source, a second point light source, and a third point light source. For the first light source unit 30a, the first, second, and third point light sources 33 may be mounted on portions of the substrate 32 facing the first corner surface 15, the first side surface 12, and the second side surface 16, respectively. Thus, the first, second, and third point light sources 33 emit light to the first corner surface 15, the first and second side surfaces 12 and 16.

In the present embodiment, the point light source 33 includes a light-emitting diode (LED) of a top view type. Thus, a light-exiting portion is formed on an upper portion of the point light source 33. The LED may include a light-emitting chip, a housing, an electrode terminal, etc. The light-emitting chip includes, for example, a p-n junction diode. An upper portion of the housing is opened, and the light-emitting chip is received on the bottom portion of the housing. The electrode terminals are connected to the light-emitting chip and are protruded toward the exterior of the housing. The electrode terminals are electrically connected to the connection terminals formed on the flexible printed circuit film 35 through a soldering method.

The second light source unit 30b includes a substrate 32 and a plurality of point light sources 33 similar to the first light source unit 30a. The substrate 32 and the point light sources 33 are disposed to face the second corner surface 17, the first and third side surfaces 12 and 18, similar to the arrangement of the first light source unit 30a. Thus, the point light sources 33 of the second light source unit 30b emit light to the second corner surface 17 and the first and third side surfaces 12 and 18 adjacent to the second corner surface 17.

An interval distance between the point light sources 33 at the first light source unit 30a is short. Moreover, the first light source unit 30a is disposed at a corner of the light guide plate 10. Thus, light emitted from the first light source unit 30a is propagated to the interior of the light guide plate 10 in a radiating shape as shown in FIG. 4. The tight corner arrangement and the radiating shape of the point light sources 33 help to avoid hot spots, which are generated due to a luminance difference between the point light sources 33 and the light guide plate 10 corresponding to the point light sources 33. Moreover, because the point light sources 33 are disposed at a corner of the light guide plate 10, and the corner surface and the adjacent side surfaces, such as the first corner surface 15 and the first and second side surfaces 12 and 16 which receive light from the point light sources 33, are disposed in an angle different from each other, luminance uniformity may be enhanced by using a small number of the point light sources 33.

Figure 5:
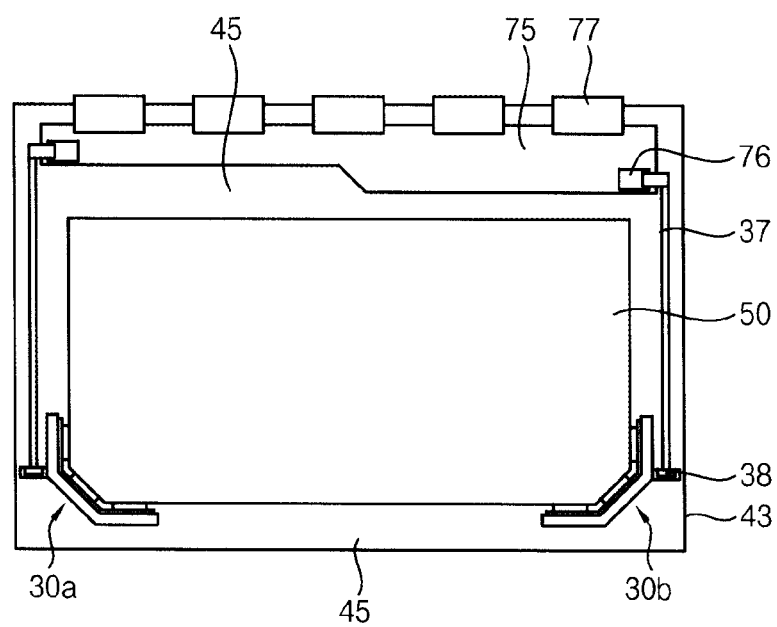
FIG. 5 is a plan view illustrating a rear surface of the light-emitting module of FIG. 1 according to one or more embodiments of the present invention.

FIG. 5 is a plan view illustrating a rear surface of light-emitting module 7 of FIG. 1 according to one or more embodiments of the present invention.

Referring to FIGS. 1, 2 and 5, the light-emitting module 7 may further include a middle frame 40, an optical sheet 20 and a reflective sheet 50.

The middle frame 40 supports the display panel assembly 70 to receive the light guide plate 10, the optical sheet 20 and a reflective sheet 50. The middle frame may include a plastic material. The middle frame 40 includes an edge portion 41, a side surface portion 43, and a rear surface portion 45. The edge portion 41 is a rectangular frame. A stepped portion in which a display panel (which is described below) will be disposed is formed at the edge portion 41. The side surface portion 43 is extended from an edge of the edge portion 41 to a lower side thereof. The rear surface portion 45 is extended from a lower side of the side surface portion 43 to be in parallel with the lower surface 13 of the light guide plate 10 as shown in FIG. 5. The rear surface portion 45 adjacent to the fourth side surface 14 of the light guide plate 10 is formed to have a width that is wider than other portion of the rear surface portion 45 to support a driving substrate (which is described below).

The first and second light source units 30a and 30b are inserted into a corner of the middle frame 40. A receiving recess (not shown) into which the first and second light source units 30a and 30b are inserted may be formed through the inside of a corner of the middle frame 40. The light guide plate 10 is inserted between the edge portion 41 and the rear surface portion 45 of the middle frame 40.

The optical sheet 20 is disposed between the edge portion 41 of the middle frame 40 and an upper surface 11 of the light guide plate 10. The optical sheet 20 enhances characteristics of light emitted through an upper surface 11 of the light guide plate 10. The optical sheet 20 includes a diffusion sheet 21 and a light-condensing sheet 23 disposed on the diffusion sheet 21. The diffusion sheet 21 diffuses light emitted from the light guide plate 10 to enhance luminance uniformity. The light-condensing sheet 23 may include a plurality of prisms. The light-condensing sheet 23 may condense light emitted from the diffusion sheet 21 in a front direction to enhance a front luminance.

The reflective sheet 50 is disposed between rear surface portion 45 of the middle frame 40 and the lower surface 13 of the light guide plate 10. The reflective sheet 50 reflects light leakage to the lower surface 13 toward the light guide plate 10.

The display device 5 further includes a back cover 80. The back cover 80 may include a chassis of a metal material. The back cover 80 includes a bottom plate 81, side walls 83, and a heat-radiating portion 85. The side walls 83 are extended from edges of the bottom plate 81 toward an upper side thereof. The heat-radiating portion 85 is protruded from the bottom plate 81 in correspondence with corners of the middle frame 40. In one or more embodiments different from those of FIG. 1, the side walls 83 may be omitted from the back cover 80. The back cover 80 covers the rear surface portion 45 of the middle frame 40. In one or more embodiments of the present invention, the heat-radiating portion 85 may have a plurality of surfaces facing the heat-radiating plate 31 of the light source unit 30 where the heat-radiating portion 85 is inserted between the heat-radiating plate 31 and the side surface portion 43 of the middle frame 40 as shown in FIG. 2. The heat-radiating portion 85 makes contact with the heat-radiating plate 31, so that heat generated from the point light source 33 may be quickly irradiated to an external side through the heat-radiating plate 31, the heat-radiating portion 85 and the bottom plate 81 of the back cover 80.

The display panel assembly 70 includes the display panel 72, the driving substrate 75, and a connection circuit film 77.

The display panel 72 includes a lower substrate 71, an upper substrate 73 facing the lower substrate 71, and a liquid crystal layer disposed between the lower and upper substrates 71 and 73. A plurality of pixels and a plurality of thin-film transistors (TFTs) which controls the pixels are formed on the lower substrate 71. The liquid crystal layer is controlled by an electric field formed by the pixels, so that light transmittance through the liquid crystal layer may be varied.

The driving substrate 75 includes a printed circuit board (PCB). The driving substrate 75 through the connection circuit film 77 provides the display panel 72 with a control signal which controls a TFT and a pixel signal which is applied to a pixel. The driving substrate 75 is electrically connected to a power supply device such as an inverter. A second connector 76, shown in FIG. 5, through which the driving substrate 75 outputs the driving power of the point light sources 33, may be formed on the driving substrate 75.

The connection circuit film 77 includes a first end portion formed at an edge portion of the lower substrate 71 to be electrically connected to input pads connected to the plurality of pixels, and a second end portion electrically connected to output pads of the driving substrate 75. The connection circuit film 77 may include a tape carrier package of a flexible material. A driving chip (not shown) which drives the plurality of pixels may be mounted on the tape carrier package.

Referring again to FIGS. 2 and 5, the connection circuit film 77 is bent along a side surface portion 43 of the middle frame 40 corresponding to the fourth side surface 14 of the light guide plate 10. The driving substrate 75 is disposed at a rear surface portion 45 of the middle frame 40 adjacent to the fourth side surface 14. Thus, the connection circuit film 77 may be disposed between the side surface portion 43 of the middle frame 40 and a side wall 83 of the back cover 80. The driving substrate 75 is disposed between the rear surface portion 45 of the middle frame 40 and a bottom plate 81 of the back cover 80.

The display device 5 further includes a power connection line 37. The power connection line 37 is connected to the first connector 38 formed on the flexible printed circuit film 35 of the first light source unit 30a as shown in FIG. 5. The power connection line 37 is drawn out toward the rear surface portion 45 of the middle frame 40, and is extended along the rear surface portion 45 to be connected to the second connector 76 formed on the driving substrate 75. The power connection line 37 includes an insulation film and a power wiring in which a copper film formed on the insulation film is patterned to form the power wiring. Driving power is delivered to the point light source 33 through the driving substrate 75, the power connection line 37, and the flexible printed circuit film 35. The light-emitting chip of the point light source 33 generates light and heat in response to the driving power. The heat is rapidly radiated through the heat-radiating plate 31, the heating radiating portion 85, and the bottom plate 81 of the back cover 80 as described above. Therefore, the heat-radiating efficiency of the point light source 33 may be enhanced, so that light of a desired luminance may be emitted through the light guide plate 10 even though the number of the point light sources 33 is small.

The display device 5 further includes a top chassis 90. The top chassis 90 is a front case. The top chassis 90 covers edges of the display panel 72 and is combined with the back cover 80 and/or the middle frame 40 to enclose the display device 5.

According to the light-emitting module 7 and the display device 5 of the present embodiment, the heat-radiating efficiency of the light source unit 30 may be enhanced. In addition, the point light sources 33 are disposed adjacent to corners of the light guide plate 10 to emit light at directions different from each other. Thus, a resultant structure according to one or more embodiments of the present invention may realize a required luminance by using a smaller number of the point light sources 33 in comparison with a structure in which a plurality of point light sources 33 are disposed at a side surface of a light guide plate 10. Consequently, power consumption and the number of components are decreased and hot spots may be removed to enhance the display quality of the display panel 72.

Figure 6:
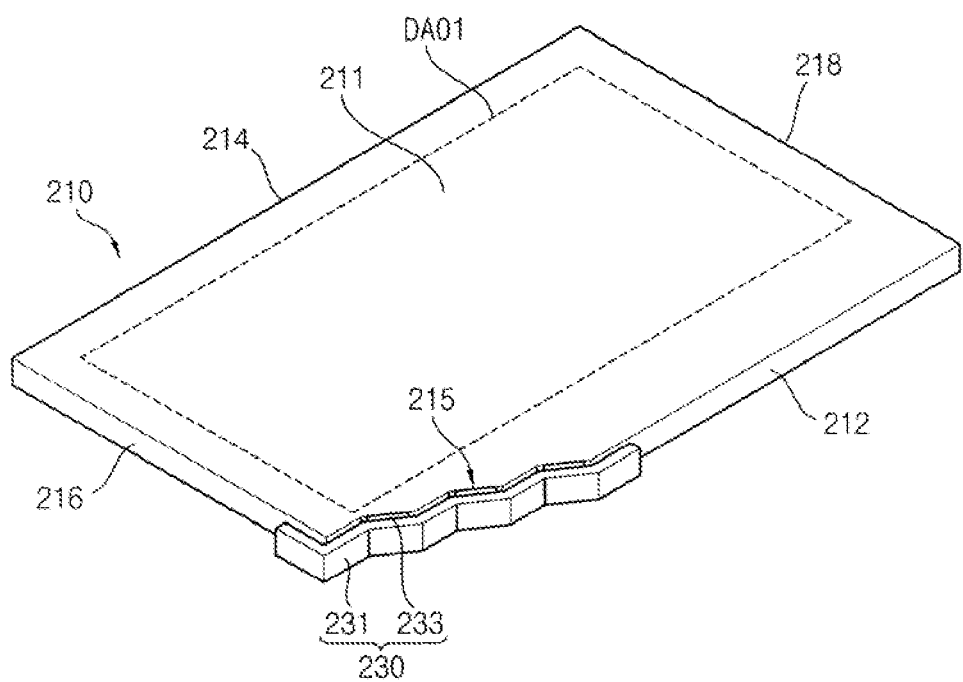
FIG. 6 is a perspective view illustrating a light-emitting module according to another embodiment of the present invention.
Figure 7:
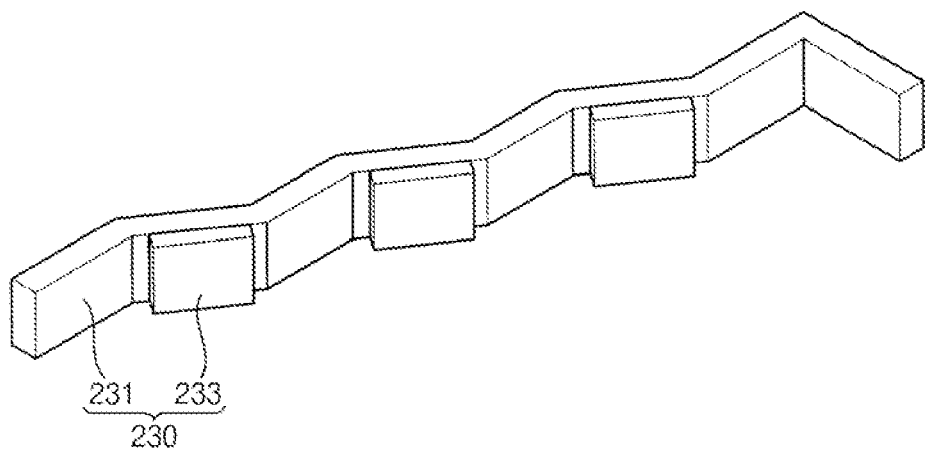
FIG. 7 is a perspective view illustrating the light source unit of FIG. 6 according to one or more embodiments of the present invention.

FIG. 6 is a perspective view illustrating a light-emitting module according to another embodiment of the present invention. FIG. 7 is a perspective view illustrating a light source unit 230 of FIG. 6 according to one or more embodiments of the present invention.

Referring to FIGS. 6 and 7, the light-emitting module of the present embodiment is substantially the same as the light-emitting module 7 of FIGS. 1 through 5 except that a cross-sectional surface formed at a corner of the light guide plate 210 has a plurality of first surfaces, the number of the light source units 230 is one, and the substrate 231 of the light source unit 230 includes a metal core type PCB 231. Thus, any detailed explanation of previously described components will hereinafter be omitted.

In the present embodiment, the light guide plate 210 has a cross-sectional surface at a corner where the first side surface 212 and the second side surface 216 meet. The corner is cut to form a corner surface 215. The corner surface 215 has a plurality of first surfaces which are continuously connected with each other. The first surfaces are formed at different angles with respect to the first side surface 212.

The light source unit 230 is disposed at the corner surface 215. The light source unit 230 includes a substrate 231 and a plurality of point light sources 233.

In the present embodiment, the substrate 231 is a metal core PCB. The substrate 231 includes a metal layer and a circuit wiring part. The metal layer is bent a plurality of times and is disposed to face the corner surface 215, and the first and second side surfaces 212 and 216 adjacent to the corner surface 215. The circuit wiring part is formed in a circuit wiring layer to be formed in an inside surface of the metal layer facing the light guide plate 210. The circuit wiring layer includes an insulation layer and a circuit wiring formed in the insulation layer.

The plurality of point light sources 233 are mounted on the circuit wiring layer to be electrically connected to the circuit wiring. The point light sources 233 are disposed on every other one of the first surfaces of the corner surface 215. A first connector connected to a power connection line is formed on the circuit wiring layer to deliver power to the point light sources 233.

The display device of the present embodiment is substantially the same as the display device 5 of FIGS. 1 through 5 except for the light-emitting module of FIGS. 6 and 7. Thus, any detailed explanation of the display device will hereinafter be omitted.

In the present embodiment, the corner surface 215 is configured by a plurality of first surfaces, and the plurality of point light sources 233 are disposed at the plurality of first surfaces in various angles. Thus, light emitted from the light source unit 230 is propagated within the light guide plate 210 in a radiating shape. Therefore, required luminance uniformity may be obtained by using a small number of the point light sources 233, hot spots may be removed, and heat-radiating efficiency may be enhanced.

Figure 8:
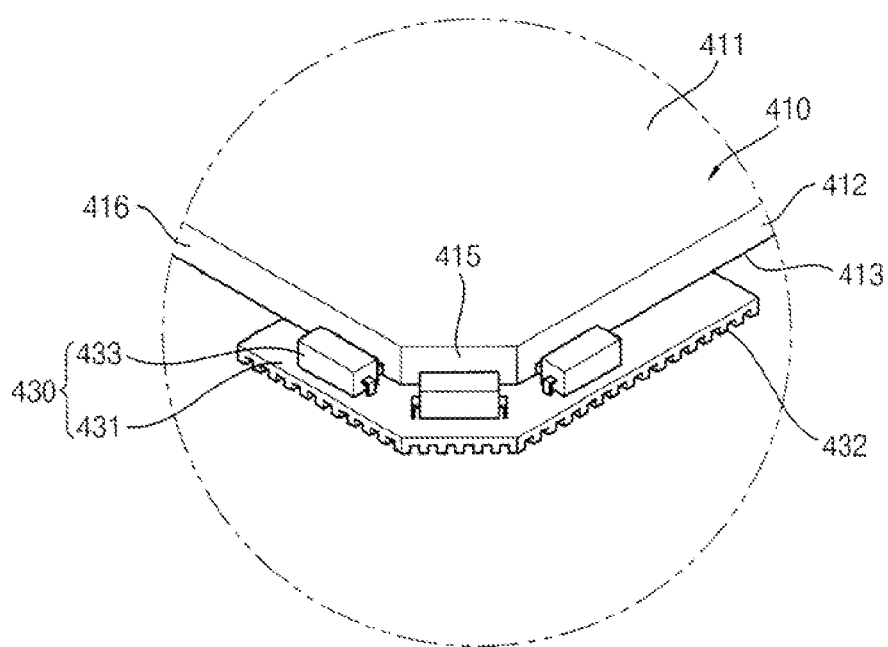
FIG. 8 is a perspective view illustrating a light-emitting module according to still another embodiment of the present invention.

FIG. 8 is a perspective view illustrating a light-emitting module according to still another embodiment of the present invention.

Referring to FIG. 8, a light-emitting module of the present embodiment is substantially the same as the light-emitting module 7 of FIGS. 1 through 5 except for the arrangement of the light source unit 430, the type of point light source 433, and that an embossed portion 432 is formed through the substrate 431. Thus, any detailed explanation or previously described components will hereinafter be omitted.

In the present embodiment, the light source unit 430 includes a substrate 431 and a plurality of point light sources 433. The substrate 431 is a metal core printed circuit substrate 431. The substrate 431 includes a metal layer and a circuit wiring layer. The metal layer is disposed at a corner surface 415 of the light guide plate 410 in parallel with a lower surface 413 of the light guide plate 410, and near a neighboring area of the first and second side surfaces 412, 416 adjacent to the corner surface. The circuit wiring layer is formed on the metal layer. A portion of the substrate 431 may be overlapped with the lower surface 413 of the light guide plate 410. Alternatively, a portion of the substrate 431 may be formed to meet with an edge of the lower surface 413.

The plurality of point light sources 433 are mounted on the circuit wiring layer. In the present embodiment, the plurality of point light sources 433 include a first point light source, a second point light source, and a third point light source. The first, second, and third point light sources are disposed to face the corner surface 415, the first side surface 412, and the second side surface 416. The point light source 433 includes an LED of a side view type. Thus, a light-exiting portion through which light exit is formed on a side surface of the point light source 433.

A plurality of embossed portions is formed through a rear surface of the metal layer. The embossed portions increase a heat-radiating area to enhance the heat-radiating efficiency. Since the substrate 431 is disposed in parallel with the lower surface 413 of the light guide plate 410, the substrate 431 may directly make contact with a bottom plate of the back cover. Thus, in the present embodiment, a heat-radiating portion may be removed from the back cover.

The display device of the present embodiment is substantially the same as the display device 5 of FIGS. 1 through 5 except for the light-emitting module of FIG. 8. Thus, any detailed explanation of the display device will hereinafter be omitted.

According to one or more embodiments of the present invention, the size of the substrate 431 may be increased in comparison with that in the embodiment of FIG. 8, so that heat-radiating efficiency may be further enhanced.

Figure 9:
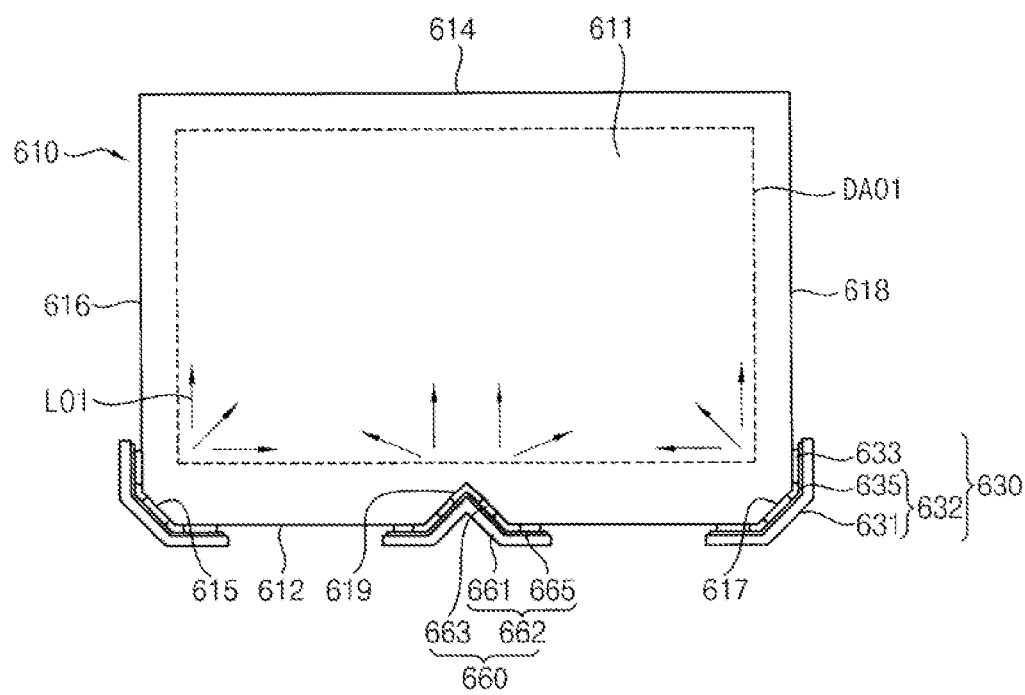
FIG. 9 is a plan view illustrating a light-emitting module according to still another embodiment of the present invention.

FIG. 9 is a plan view illustrating a light-emitting module according to still another embodiment of the present invention.

Referring to FIG. 9, a light-emitting module of the present embodiment is substantially the same as the light-emitting module 7 of FIGS. 1 through 5 except that a third cross-sectional surface 619 is further formed at a first side surface of the light guide plate 610 and that the number of light source units 630 and 660 is three. Thus, any detailed explanation of previously described components will hereinafter be omitted.

In the present embodiment, the light guide plate 610 includes a first corner surface 615, a second corner surface 617, and a third cross-sectional surface 619. The first corner surface 615 is formed at a corner at which the first side surface 612 and the second side surface 616 meet. The second corner surface 617 is formed at a corner at which the first side surface 612 and the third side surface 618 meet. The third cross-sectional surface 619 is defined by a recess surface formed at a substantially center portion of the first side surface 612, that is, a side surface of the recess. The recess is formed through the first side surface 612 in a shape substantially similar to a V-shape.

In the present embodiment, the light source units 630 and 660 are disposed at the first and second corner surfaces 615 and 617, and at the third cross-sectional surface 619, respectively. A light source unit disposed at the first and second corner surfaces 615 and 617 is defined as a first light source unit 630, and a light source unit disposed at the third cross-sectional surface 619 is defined as a third light source unit 660. The first light source unit 630 is substantially the same as the light source unit 30 of FIGS. 1 through 5, and thus any detailed explanation thereof will hereinafter be omitted.

The third light unit 660 includes a substrate 662 and a point light source 663. The substrate 662 includes a heat-radiating plate 661 and a flexible printed circuit film 665 that is laminated on the heat-radiating plate 661. The substrate is bent a plurality of times to be disposed to face the V-shape of the third cross-sectional surface 619 and the first side surface 612 adjacent to the third cross-sectional surface 619. The point light source 663 includes an LED of a top view type. The point light source 663 is mounted on the flexible printed circuit film 665 to emit light to the third cross-sectional surface 619 and the first side surface 612.

The display device of the present embodiment is substantially the same as the display device 5 of FIGS. 1 through 5 except for the light-emitting module of FIG. 9. Thus, any detailed explanation of the display device will hereinafter be omitted.

In the present embodiment, in addition to the first corner surface 615 and the second corner surface 617, the third cross-sectional surface 619, near which the third light source unit 660 is disposed, is formed not through the first and second corner surfaces 615 and 617, but through the first side surface 612. Thus, the present embodiment may have a structure having the effects of the aforementioned embodiments and capable of providing light to a large-scaled light guide plate.

Figure 10:
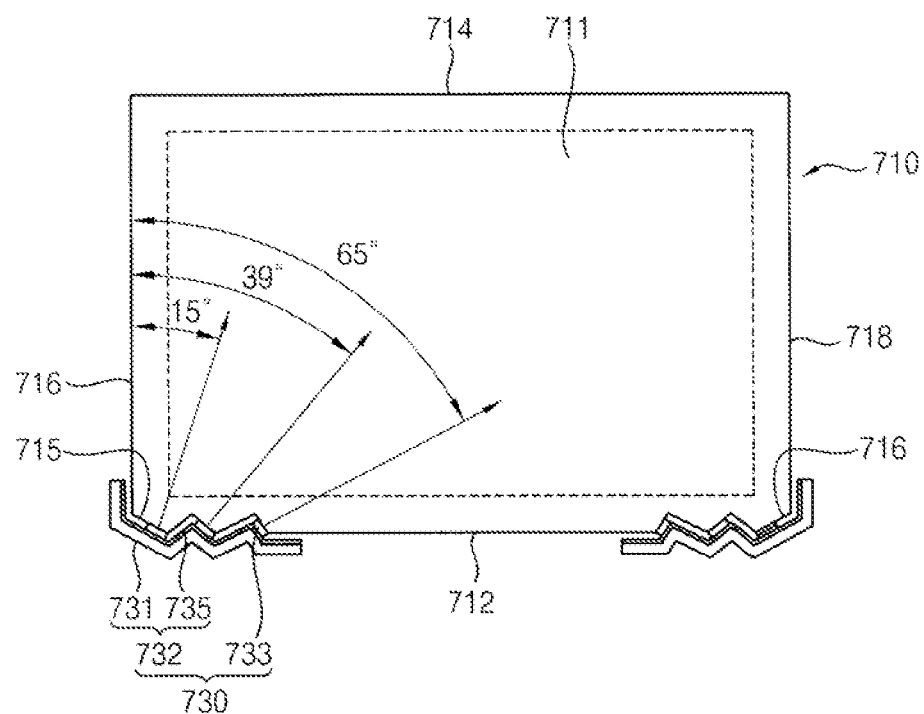
FIG. 10 is a plan view illustrating a light-emitting module according to another embodiment of the present invention.
Figure 11:
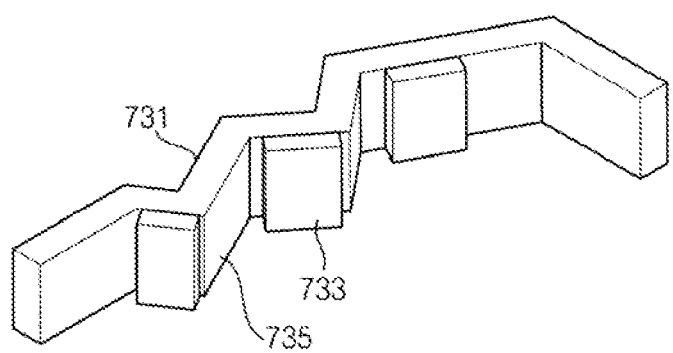
FIG. 11 is a perspective view illustrating a light source unit of FIG. 10 according to one or more embodiments of the prevent invention.
Figure 12A:
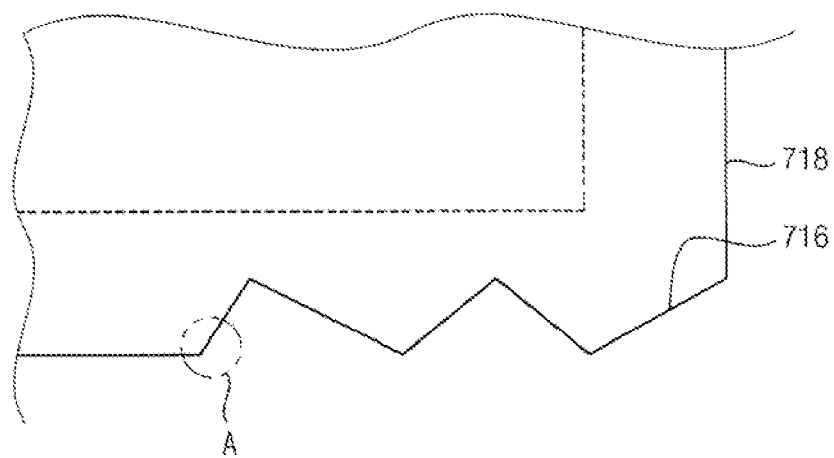
FIG. 12A is a detailed view of the corner surface of the saw tooth light guide structure of FIG. 10 according to one or more embodiments of the present invention.
Figure 12B:
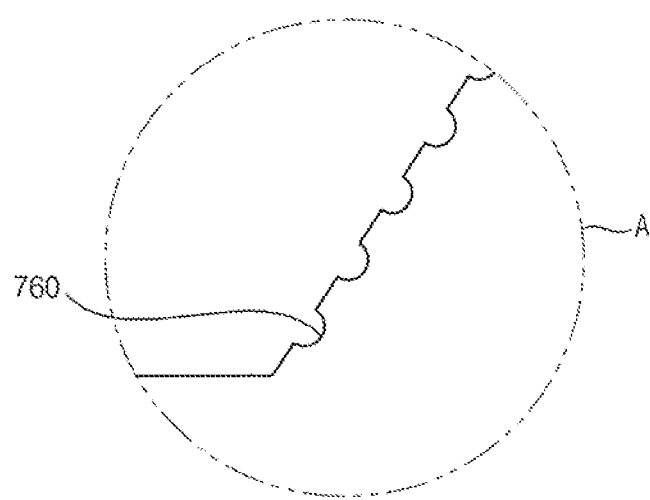
FIG. 12B is an enlarged view of a portion 'A' in FIG. 12A.

FIG. 10 is a plan view illustrating a light-emitting module according to another embodiment of the present invention. FIG. 11 is a perspective view illustrating a light source unit 730 of FIG. 10 according to one or more embodiments of the prevent invention. FIG. 12A is a detailed view of the corner surface of the saw tooth light guide structure of FIG. 10 according to one or more embodiments of the present invention, FIG. 12B is an enlarged view of a portion 'A' in FIG. 12A.

Referring to FIGS. 10, 11, 12A and 12B, the light-emitting module of the present embodiment is similar to that of FIG. 6. However, the cross-sectional surfaces formed at two corners of the light guide plate 710, in addition to having a saw tooth structure with a plurality of surfaces where the plurality of surfaces form different angles with a side surface of the light guide plate 710, may also have serrations on the surfaces.

The light guide plate 710 is cut at two corners to expose cross-sectional surfaces at the corners for mounting two light source units 730. The first corner surface 715 is formed at the corner where the first side surface 712 and the second side surface 716 meet. The second corner surface 716 is formed at the corner where the first side surface 712 and the third side surface 718 meet. The corner surfaces 715 and 716 expose a plurality of cross-sectional surfaces of the first side surface 712 in a saw tooth structure where the plurality of cross-sectional surfaces are continuously connected with one another. In addition, the plurality of cross-sectional surfaces may form different tilt angles with respect to a side surface. For example, the tilt angles of the cross-sectional surfaces of the first corner surface 715 with respect to the second side surface 716 may be 15°, 39°, and 65° as shown in FIG. 10. The different tilt angles may be exploited by the plurality of point light sources 733 of the light source unit 730 to achieve uniformity of luminance.

The light source unit 730 may include a substrate 732 and a plurality of point light sources 733 as before. Similarly, the substrate 732 may further include a heat radiating plate 731 and a circuit wiring part 735 as before. The substrate is bent a plurality of times and disposed to face the corner surface and the two adjacent side surfaces.

The plurality of point light sources 733 are mounted on the circuit wiring part 735. As shown in FIG. 11, the light source unit 730 may have three point light sources 733 with a point light source 733 disposed on every other surface of the substrate to provide light to every other cross-sectional surface of the corner surface. The point light sources 733 may include LEDs of a side view type.

Referring to FIGS. 12A and 12B, a cross-sectional surface of the second corner surface 716 is magnified to reveal the serrated structure on the cross-sectional surface. The serrated structure may include a series of semi-circular lens in order to broaden an angular distribution of the incident light. In particular, the serrated structure may enhance the uniformity of luminance on the light guide plate.

In one or more embodiments of the present invention, when the size of the light guide plate is increased and the luminance of a required amount of emitted light is correspondingly increased, a plurality of cross-sectional surfaces may be formed through the four corner surfaces and a plurality of side surfaces of the light guide plate. A plurality of light source units may thus be disposed at the plurality of cross-sectional surfaces.

According to one or more embodiments of the present invention, the number of light sources such as an LED may be decreased, and the required luminance may be obtained even when using a small number of light sources. In addition, defects such as hot spots may be prevented, and heat-radiating efficiency may be enhanced. Thus, manufacturing costs and power consumption of a light-emitting module may be decreased. Therefore, one or more embodiments of the present invention may be employed in an illuminating device and a backlight module of a display device using LEDs as a light source.

The foregoing embodiments are illustrative of the present invention and are not to be construed as limiting thereof. Although a few embodiments of the present invention have been described, those skilled in the art will readily appreciate that many modifications in form and detail are possible to the embodiments without materially departing from the spirit and scope of the present invention. Accordingly, all such modifications are intended to be included within the scope of the present invention as defined in the claims.

What is claimed is:

1. A display device comprising:
a light guide plate comprising an upper surface, a lower surface facing the upper surface, a plurality of side surfaces connecting the upper surface and the lower surface, and a cross-sectional surface having a plurality of light incident surfaces and a plurality of connecting surfaces connecting adjacent light incident surfaces;
a display panel assembly comprising a display panel disposed on the upper surface, and a driving substrate configured to drive the display panel; and
a light source unit comprising a first substrate having surfaces opposite each of the cross-sectional surfaces,
wherein the plurality of light incident surfaces have different light emitting angle with respect to one of the plurality of side surfaces,
wherein all of the different light emitting angles are acute angles with respect to one of the plurality of side surfaces, and
wherein the light incident surfaces are substantially perpendicular to light emitting directions and the light emitting directions do not intersect each other within the light guide plate.

2. The display device of claim 1, further comprising a recess surface having two recess plane formed by removing a portion of the light guide plate from one of the side surface to an interior of the light guide plate, and
wherein a plurality of point light sources are mounted on each of the two recess planes.

3. The display device of claim 2, wherein the cross-sectional surface is formed at both ends of one of the plurality of side surfaces.

4. The display device of claim 3, wherein the plurality of light incident surfaces are formed on one of the plurality of side surfaces.

5. The display device of claim 4, wherein the different light emitting angles with respect to one of the plurality of side surfaces decrease according to an increase in distance from an adjacent side surface, which is close to the plurality of light incident surfaces, to one of the plurality of light incident surfaces.

6. The display device of claim 3, wherein the different light emitting angles with respect to one of the plurality of side surfaces decrease according to an increase in distance from an adjacent side surface, which is close to the plurality of light incident surfaces, to one of the plurality of light incident surfaces.

7. The display device of claim 2, wherein the plurality of light incident surfaces are formed on one of the plurality of side surfaces.

8. The display device of claim 7, wherein the different light emitting angles with respect to one of the plurality of side surfaces decrease according to an increase in distance from an adjacent side surface, which is close to the plurality of light incident surfaces, to one of the plurality of light incident surfaces.

9. The display device of claim 2, wherein the different light emitting angles with respect to one of the plurality of side surfaces decrease according to an increase in distance from an adjacent side surface, which is close to the plurality of light incident surfaces, to one of the plurality of light incident surfaces.

10. The display device of claim 1, wherein the cross-sectional surface is formed at both ends of one of the plurality of side surfaces.

11. The display device of claim 10, wherein the plurality of light incident surfaces are formed on one of the plurality of side surfaces.

12. The display device of claim 11, wherein the different light emitting angles with respect to one of the plurality of side surfaces decrease according to an increase in distance from an adjacent side surface, which is close to the plurality of light incident surfaces, to one of the plurality of light incident surfaces.

13. The display device of claim 10, wherein the different light emitting angles with respect to one of the plurality of side surfaces decrease according to an increase in distance from an adjacent side surface, which is close to the plurality of light incident surfaces, to one of the plurality of light incident surfaces.

14. The display device of claim 1, wherein the plurality of light incident surfaces are formed on one of the plurality of side surfaces.

15. The display device of claim 14, wherein the different light emitting angles with respect to one of the plurality of side surfaces decrease according to an increase in distance from an adjacent side surface, which is close to the plurality of light incident surfaces, to one of the plurality of light incident surfaces.

16. The display device of claim 1, wherein the different light emitting angles with respect to one of the plurality of side surfaces decrease according to an increase in distance from an adjacent side surface, which is close to the plurality of light incident surfaces, to one of the plurality of light incident surfaces.

* * * * *